US011286361B2

(12) United States Patent
Katagiri et al.

(10) Patent No.: US 11,286,361 B2
(45) Date of Patent: Mar. 29, 2022

(54) SUPPORT WITH ANTIBACTERIAL LAYER AND LAMINATE

(71) Applicant: FUJIFILM Corporation, Tokyo (JP)

(72) Inventors: Toshiyuki Katagiri, Ashigara-kami-gun (JP); Norihiro Omae, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/144,375

(22) Filed: Sep. 27, 2018

(65) Prior Publication Data
US 2019/0021314 A1 Jan. 24, 2019

Related U.S. Application Data

(63) Continuation of application No. PCT/JP2017/009244, filed on Mar. 8, 2017.

(30) Foreign Application Priority Data

Mar. 28, 2016 (JP) .............................. JP2016-063425

(51) Int. Cl.
*B32B 27/08* (2006.01)
*C08J 7/043* (2020.01)
(Continued)

(52) U.S. Cl.
CPC .............. *C08J 7/043* (2020.01); *A01N 25/34* (2013.01); *A01N 59/00* (2013.01); *B32B 5/16* (2013.01);
(Continued)

(58) Field of Classification Search
CPC ............ B32B 27/32; B32B 7/04; B32B 27/16; B32B 25/08; B32B 27/302; B32B 27/26;
(Continued)

(56) References Cited

U.S. PATENT DOCUMENTS 5,147,338 A * 9/1992 Lang ................. A61F 13/00046
602/47
6,013,275 A 1/2000 Konagaya et al.
(Continued)

FOREIGN PATENT DOCUMENTS

CN 101107020 A 1/2008
EP 0 846 418 A1 6/1998
(Continued)

OTHER PUBLICATIONS

Database WPI, Clarivate Analytics, 2017, Week 201130 Thomson Scientific, London, GB; AN 2011-E16615 XP002786938 (4 pages) (citing JP 2011 079900, Apr. 21, 2011 of record).
(Continued)

*Primary Examiner* — Samir Shah
(74) *Attorney, Agent, or Firm* — Sughrue Mion, PLLC

(57) ABSTRACT

Provided are a support with an antibacterial layer, which exhibits excellent followability with respect to a curved surface and in which peeling does not easily occur between a support and an antibacterial layer even though the support with an antibacterial layer is bonded to a curved surface, and a laminate including the support with an antibacterial layer. The support with an antibacterial layer of the present invention includes a support and an antibacterial layer disposed in at least a portion on the support, in which the support contains a urethane resin, and the antibacterial layer contains a hydrophilic polymer and an antibacterial agent.

24 Claims, 3 Drawing Sheets

(51) Int. Cl.

| | | |
|---|---|---|
| *B32B 27/40* | (2006.01) | |
| *B32B 27/18* | (2006.01) | |
| *B32B 27/28* | (2006.01) | |
| *B32B 27/30* | (2006.01) | |
| *B32B 27/32* | (2006.01) | |
| *B32B 25/08* | (2006.01) | |
| *B32B 7/06* | (2019.01) | |
| *B32B 25/04* | (2006.01) | |
| *B32B 5/16* | (2006.01) | |
| *B32B 27/36* | (2006.01) | |
| *B32B 27/14* | (2006.01) | |
| *B32B 27/16* | (2006.01) | |
| *B32B 25/16* | (2006.01) | |
| *B32B 7/04* | (2019.01) | |
| *B32B 27/34* | (2006.01) | |
| *B32B 25/12* | (2006.01) | |
| *C08J 7/04* | (2020.01) | |
| *C08J 7/046* | (2020.01) | |
| *C08J 7/056* | (2020.01) | |
| *A01N 25/34* | (2006.01) | |
| *A01N 59/00* | (2006.01) | |
| *B32B 7/12* | (2006.01) | |
| *B32B 27/20* | (2006.01) | |
| *B32B 27/26* | (2006.01) | |
| *B05D 1/42* | (2006.01) | |
| *B29C 45/14* | (2006.01) | |
| *B29K 675/00* | (2006.01) | |

(52) U.S. Cl.
CPC ............... *B32B 7/04* (2013.01); *B32B 7/06* (2013.01); *B32B 7/12* (2013.01); *B32B 25/047* (2013.01); *B32B 25/08* (2013.01); *B32B 25/12* (2013.01); *B32B 25/16* (2013.01); *B32B 27/08* (2013.01); *B32B 27/14* (2013.01); *B32B 27/16* (2013.01); *B32B 27/18* (2013.01); *B32B 27/20* (2013.01); *B32B 27/26* (2013.01); *B32B 27/28* (2013.01); *B32B 27/281* (2013.01); *B32B 27/283* (2013.01); *B32B 27/286* (2013.01); *B32B 27/30* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *C08J 7/046* (2020.01); *C08J 7/0427* (2020.01); *C08J 7/056* (2020.01); *B05D 1/42* (2013.01); *B29C 45/14811* (2013.01); *B29K 2675/00* (2013.01); *B29K 2995/007* (2013.01); *B29K 2995/0092* (2013.01); *B32B 2250/02* (2013.01); *B32B 2250/03* (2013.01); *B32B 2255/10* (2013.01); *B32B 2255/26* (2013.01); *B32B 2264/10* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2264/12* (2013.01); *B32B 2307/21* (2013.01); *B32B 2307/3065* (2013.01); *B32B 2307/51* (2013.01); *B32B 2307/516* (2013.01); *B32B 2307/518* (2013.01); *B32B 2307/536* (2013.01); *B32B 2307/546* (2013.01); *B32B 2307/584* (2013.01); *B32B 2307/7145* (2013.01); *B32B 2307/728* (2013.01); *B32B 2307/732* (2013.01); *B32B 2307/748* (2013.01); *B32B 2457/208* (2013.01); *C08J 2375/04* (2013.01); *C08J 2433/08* (2013.01)

(58) Field of Classification Search
CPC ......... B32B 27/14; B32B 27/18; B32B 27/20; B32B 27/30; B32B 27/304; B32B 7/06; B32B 27/283; B32B 7/12; B32B 27/286; B32B 27/08; B32B 27/308; B32B 27/40; B32B 27/322; B32B 27/365; B32B 25/047; B32B 27/34; B32B 27/28; B32B 27/36; B32B 27/281; B32B 25/12; B32B 25/16; B32B 5/16; B32B 2307/21; B32B 2307/584; B32B 2250/02; B32B 2264/107; B32B 2307/518; B32B 2307/546; B32B 2264/104; B32B 2264/105; B32B 2307/516; B32B 2255/26; B32B 2307/748; B32B 2307/732; B32B 2264/108; B32B 2264/12; B32B 2457/208; B32B 2307/51; B32B 2255/10; B32B 2250/03; B32B 2264/102; B32B 2307/536; B32B 2307/3065; B32B 2264/10; B32B 2307/728; B32B 2307/7145; C08J 7/046; C08J 7/056; C08J 7/0427; C08J 7/043; C08J 2433/08; C08J 2375/04; A01N 59/00; A01N 25/34; B05D 1/42; B29K 2995/007; B29K 2675/00; B29K 2995/0092; B29C 45/14811
See application file for complete search history.

(56) References Cited

U.S. PATENT DOCUMENTS

| | | | |
|---|---|---|---|
| 2006/0165762 A1* | 7/2006 | Plaut | A61F 13/0203 424/445 |
| 2006/0222845 A1 | 10/2006 | Deng et al. | |
| 2011/0287244 A1* | 11/2011 | Murayama | C09D 5/002 428/220 |
| 2012/0220975 A1* | 8/2012 | Chan | A61F 13/0206 604/384 |
| 2016/0287743 A1* | 10/2016 | Andrews | A61L 15/225 |
| 2017/0013842 A1 | 1/2017 | Nagasaki et al. | |
| 2017/0066929 A1* | 3/2017 | Nariyuki | A61B 6/00 |

FOREIGN PATENT DOCUMENTS

| | | |
|---|---|---|
| JP | 7-316420 A | 12/1995 |
| JP | 2006-518775 A | 8/2006 |
| JP | 2011-79900 A | 4/2011 |
| JP | 2011-246672 A | 12/2011 |
| JP | 2015-003519 A | 1/2015 |
| JP | 2015-189196 A | 11/2015 |
| TW | 201536549 A | 10/2015 |
| WO | 97/42824 A1 | 11/1997 |
| WO | 2015/071653 A1 | 5/2015 |
| WO | 2015/178166 A1 | 11/2015 |

OTHER PUBLICATIONS

Database WPI, Clarivate Analytics, 2017, Week 201570 Thomson Scientific, London, GB; AN 2015-59916S XP002786944 (4 pages) (citing JP 2015 189196, Nov. 2, 2015 of record).

Communication dated Dec. 11, 2018, from European Patent Office in counterpart application No. 17774137.8.

International Preliminary Report on Patentability and translation of Written Opinion issued from the International Bureau in counterpart International Application No. PCT/JP2017/009244, dated Oct. 2, 2018.

Written Opinion issued by the International Searching Authority in corresponding International Application No. PCT/JP2017/009244, dated Jun. 13, 2017.

(56) References Cited

OTHER PUBLICATIONS

International Search Report issued by the International Searching Authority in corresponding International Application No. PCT/JP2017/009244, dated Jun. 13, 2017.
Communication dated Jun. 18, 2019, from the Japanese Patent Office in counterpart application No. 2018-508895.
Communication dated Jan. 13, 2020 from the State Intellectual Property Office of the P.R.C. in Application No. 201780018472.1.
Communication dated Jan. 28, 2020 from Japanese Patent Office in JP Application No. 2018-508895.
Office Action dated Sep. 22, 2020 by The State Intellectual Property Office of the People's Republic of China in Chinese application No. 201780018472.1.
Office Action dated Apr. 6, 2021, from the Japanese Patent Office in Japanese Application No. 2020-092070.

* cited by examiner

SUPPORT WITH ANTIBACTERIAL LAYER AND LAMINATE

CROSS-REFERENCE TO RELATED APPLICATIONS

This application is a Continuation of PCT International Application No. PCT/JP2017/009244 filed on Mar. 8, 2017, which claims priority under 35 U.S.C. § 119(a) to Japanese Patent Application No. 2016-063425 filed on Mar. 28, 2016. The above application is hereby expressly incorporated by reference, in its entirety, into the present application.

BACKGROUND OF THE INVENTION

1. Field of the Invention

The present invention relates to a support with an antibacterial layer and a laminate.

2. Description of the Related Art

A support with an antibacterial layer including a support and an antibacterial layer disposed on the support is known. The antibacterial layer has a function of inhibiting the growth of germs on a surface thereof. The support with an antibacterial layer is used, for example, for packing goods such as foods, in a surface member of electronic instruments, medical instruments, and the like, and in a building material such as wallpaper.

JP2006-518775A describes an antimicrobial polymer film including a polymer substrate layer having first and second surfaces, in which a polymer coating on the surfaces of the polymer substrate layer contains an antimicrobial compound, the antimicrobial compound contains silver, and the polymer substrate is selected from polyester, polyolefin, polyamide, and polyvinylchloride (PVC).

SUMMARY OF THE INVENTION

The inventors of the present invention carried out an examination in which the antimicrobial polymer film described in JP2006-518775A was used as a surface member by being bonded to the surface of goods. As a result, it was revealed that in a case where the antimicrobial polymer film is bonded to a curved surface, unfortunately, peeling occurs between the polymer substrate layer and the polymer coating.

Therefore, an object of the present invention is to provide a support with an antibacterial layer which exhibits excellent followability with respect to a curved surface and in which peeling does not easily occur between a support and an antibacterial layer even though the support with an antibacterial layer is bonded to a curved surface. Another object of the present invention is to provide a laminate including the support with an antibacterial layer and a pressure sensitive adhesive layer.

In order to achieve the aforementioned object, the inventors of the present invention carried out examinations. As a result, the inventors have found that the object can be achieved by a support with an antibacterial layer including a support and an antibacterial layer disposed in at least a portion on the support, in which the support contains a urethane resin, and the antibacterial layer contains a hydrophilic polymer and an antibacterial agent.

That is, the inventors have found that the object can be achieved by the following constitution.

[1] A support with an antibacterial layer, comprising a support and an antibacterial layer disposed in at least a portion on the support, in which the support contains a urethane resin, and the antibacterial layer contains a hydrophilic polymer and an antibacterial agent.

[2] The support with an antibacterial layer described in [1], in which a water contact angle of a surface of the antibacterial layer is 20° to 60°.

[3] The support with an antibacterial layer described in [1] or [2], in which the antibacterial agent contains silver.

[4] The support with an antibacterial layer described in any one of [1] to [3], in which a surface of the support and the antibacterial layer are in direct contact with each other.

[5] The support with an antibacterial layer described in any one of [1] to [4], in which a pencil hardness of the antibacterial layer is equal to or higher than 2H.

[6] The support with an antibacterial layer described in any one of [1] to [5], in which a Vickers hardness of the antibacterial layer is equal to or higher than 1.33.

[7] The support with an antibacterial layer described in any one of [1] to [6] that has a film thickness of 30 to 350 μm.

[8] A laminate comprising the support with an antibacterial layer described in any one of [1] to [7] and a pressure sensitive adhesive layer, in which the antibacterial layer, the support, and the pressure sensitive adhesive layer are laminated in this order.

According to the present invention, it is possible to provide a support with an antibacterial layer which exhibits excellent followability with respect to a curved surface and in which peeling does not easily occur between a support and an antibacterial layer even though the support with an antibacterial layer is bonded to a curved surface (hereinafter, described as "has the effects of the present invention" as well). Furthermore, according to the present invention, it is possible to provide a laminate including the support with an antibacterial layer and a pressure sensitive adhesive layer.

DESCRIPTION OF THE PREFERRED EMBODIMENTS

Hereinafter, the present invention will be specifically described.

The following constituents will be explained based on typical embodiments of the present invention in some cases, but the present invention is not limited to the embodiments.

In the present specification, in a case where a group (atomic group) is described without comments regarding whether the group is substituted or unsubstituted, as long as the effects of the present invention are not impaired, the group includes both a group that does not have a substituent and a group that has a substituent. For example, "alkyl group" includes not only an alkyl group that does not have a substituent (unsubstituted alkyl group) but also an alkyl group having a substituent (substituted alkyl group). The same is true for each compound.

Furthermore, in the present specification, "(meth)acrylate" represents either or both of acrylate and methacrylate, and "(meth)acryl" represents either or both of acryl and methacryl.

In addition, in the present specification, a range of numerical values described using "to" means a range including numerical values listed before and after "to" as a lower limit and an upper limit respectively.

[Support with Antibacterial Layer]

A support with an antibacterial layer according to a first embodiment of the present invention includes a support and an antibacterial layer disposed in at least a portion on the support. One of the characteristics of the support with an antibacterial layer is that the support contains a urethane resin. Hereinafter, the support with an antibacterial layer will be specifically described with reference to drawings.

Figure 1:
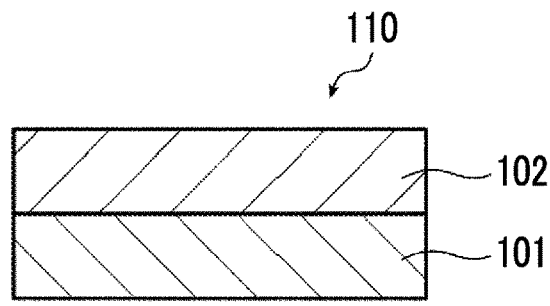
FIG. 1 is a cross-sectional view of a support with an antibacterial layer according to a first embodiment of the present invention.

FIG. 1 is a cross-sectional view of the support with an antibacterial layer according to the first embodiment of the present invention. A support with an antibacterial layer 110 includes a support 101 and an antibacterial layer 102. The antibacterial layer 102 contains an antibacterial agent which is not shown in the drawing. In the support with an antibacterial layer 110, a surface of the support 101 and the antibacterial layer 102 are in direct contact with each other.

Figure 2:
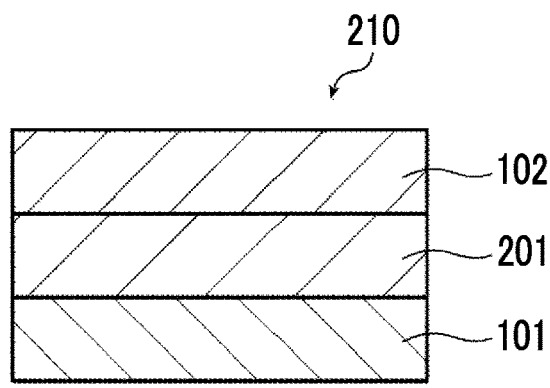
FIG. 2 is a cross-sectional view of a modification example of the support with an antibacterial layer according to the first embodiment of the present invention.

FIG. 2 shows a modification example of the support with an antibacterial layer according to the first embodiment of the present invention. A support with an antibacterial layer 210 includes a primer layer 201 between the support 101 and the antibacterial layer 102. The primer layer 201 has a function of causing the support 101 and the antibacterial layer 102 to adhere to each other.

The support 101 in the supports with an antibacterial layer 110 and 210 contains a urethane resin, and the urethane resin has flexibility. Therefore, presumably, in a case where the supports with an antibacterial layer 110 and 210 are bonded to a curved surface, the supports with an antibacterial layer 110 and 210 could be easily deformed according to the shape of the curved surface. Furthermore, presumably, because the urethane resin is highly interactive with the antibacterial layer 102 and the primer layer 201, peeling may not easily occur between the support and the antibacterial layer. On a surface of the antibacterial layer 102, a protective sheet, which is not shown in the drawing, for protecting the surface may be disposed. In a case where the protective sheet is disposed, the protective sheet is removed at the time of use.

The antibacterial layer 102 may be disposed on the entire surface of the support 101 or disposed in a portion on the support 101.

Hereinafter, each of the members constituting the support with an antibacterial layer will be specifically described.

[Support]

The support with an antibacterial layer has a support. The support is not particularly limited as long as it contains a urethane resin, and known supports can be used.

<Urethane Resin>

"Urethane resin" is a generic term of resins having a urethane bond, and examples thereof include thermoplastic resins obtained by reacting a polyol or a polyamine with polyisocyanate. The urethane resin may be a resin obtained by adding a crosslinking agent and/or a chain extender to the thermoplastic resins and further reacting them together.

As the polyol, it is possible to use known polyols having two or more hydroxyl groups in one molecule. Examples thereof include long-chain polyols such as polyester polyol, polycarbonate polyol, and polyether polyol and short-chain polyols such as ethylene glycol, 1,3-propylene glycol, 1,3-butanediol, 1,4-butanediol, 1,6-hexanediol, 1,10-decamethylenediol, and bisphenol A. One kind of polyol may be used singly, or two or more kinds of polyols may be used in combination.

Examples of the polyamine include ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, hydrazine, polyamide polyamine, polyethylene polyamine, and the like. One kind of polyamine may be used singly, or two or more kinds of polyamines may be used in combination.

As the polyisocyanate, aliphatic and/or aromatic isocyanates can be used. Examples thereof include tolylene diisocyanate, diphenylmethane diisocyanate, dicyclohexylmethane diisocyanate, triphenyl diisocyanate, xylene diisocyanate, polymethylene polyphenylene polyisocyanate, hexamethylene diisocyanate, isophorone diisocyanate, o-toluidine diisocyanate, naphthalene diisocyanate, xylylene diisocyanate, lysine diisocyanate, and the like. One kind of polyisocyanate may be used singly, or two or more kinds of polyisocyanates may be used in combination.

As the crosslinking agent, compounds having three or more functional groups can be used. Examples thereof include a polyol having three or more functional groups, a polyamine having three or more functional groups, and a polyisocyanate having three or more functional groups. Examples of the polyisocyanate having three or more functional groups include a polyfunctional polyisocyanate having an isocyanurate structure and a polyfunctional polyisocyanate having a Biuret structure.

As the crosslinking agent, glycerin, trimethylolpropane, pentaerythritol, polyoxypropylene triol, and the like can also be used. One kind of crosslinking agent may be used singly, or two or more kinds of crosslinking agents may be used in combination.

The content of the urethane resin in the support with respect to the total mass of the support is preferably 70% to 100% by mass, more preferably 80% to 100% by mass, and even more preferably 90% to 100% by mass, because then the support with an antibacterial layer has the further improved effects of the present invention.

Examples of commercial products of the urethane resin include "DU605-CER" manufactured by Sheedom Co., Ltd., "SDS96" manufactured by Okura Industrial Co., Ltd., and the like.

<Other Resins>

The support may contain resins other than the urethane resin as long as the support with an antibacterial layer exerts the effects of the present invention. Examples of the resins other than the urethane resin include natural rubber, polyolefin, polyvinylchloride, polytetrafluoroethylene, polyester, polyamide, polycarbonate, silicone polymers, poly(meth)acrylate, polystyrene, polysulfone, polyisoprene, polyurea, and the like. One kind of other resins may be used singly, or two or more kinds of other resins may be used in combination.

It is preferable that a ratio of the mass of other resins to the mass of the urethane resin (other resins/urethane resin) in the total mass of the support containing other resins described above is preferably 1/99 to 20/80, and more preferably 1/99 to 10/90. In a case where the mass ratio is within the above range, the support with an antibacterial layer has the further improved effects of the present invention.

<Other Optional Components>

Additives other than the aforementioned resins may be added to the support as long as the support exerts the effects of the present invention. Examples of the additives include an ultraviolet absorber, a filler, an antistaling agent, an antistatic agent, a flame retardant, a tackifier, a dispersant, an antioxidant, an antifoaming agent, a leveling agent, a matting agent, a light stabilizer, a dye, a pigment, and the like.

The method for manufacturing the support is not particularly limited as long as the aforementioned resin can be molded in the form of a film (hereinafter, described as "formed into a film" as well), and known methods can be used. Examples of specific molding methods include a melting extrusion molding, press molding, injection molding, calendar molding, a solvent casting method, and the like. Furthermore, after being molded in the form of a film, the resin may be further subjected to uniaxial stretching and/or biaxial stretching.

In a case where the aforementioned resin is molded by a solvent casting method, the resin may be used by being dissolved in a solvent (water or an organic solvent).

(Tensile Elastic Modulus of Support)

The tensile elastic modulus of the support is preferably 5 to 150 MPa, and more preferably 30 to 110 MPa. In a case where the tensile elastic modulus of the support is within the above range, and the support with an antibacterial layer is bonded to a curved surface, the support with an antibacterial layer can be easily deformed according to the shape of an adherend. In the present specification, the property in which the support with an antibacterial layer is easily deformed according to the shape of an adherend is described as "high followability" with respect to the shape of an adherend as well.

In the present specification, the tensile elastic modulus can be calculated by preparing test pieces punched in the form of a dumbbell based on Japanese Industrial Standards (JIS) K 7127:1999 and performing a tensile test under the following conditions.

Test temperature: 25° C.
Tensile rate: 50 mm/min
Distance between chucks: 80 mm
Width of test piece: 10 mm
Length of test piece: 150 mm
Distance between evaluation points: 50 mm (Film Thickness of Support)

The film thickness of the support is not particularly limited, but is preferably 10 to 1,000 µM, more preferably 20 to 350 µm, and even more preferably 30 to 200 µm. The film thickness of the support is a value determined by measuring the film thickness at any ten points on the surface of the support by using a micrometer and calculating the arithmetic mean thereof.

A surface treatment such as a corona treatment or a plasma treatment may be performed on the entirety or a portion of the surface of the support.

[Antibacterial Layer]

The antibacterial layer contains a hydrophilic polymer and an antibacterial agent.

<Hydrophilic Polymer>

The hydrophilic polymer is a polymer having a hydrophilic group.

In a case where the hydrophilic polymer is contained in the antibacterial layer, an antibacterial layer having further improved hydrophilicity is obtained, and hence the contaminants having adhered onto the antibacterial layer can be easily removed by washing the antibacterial layer with water or the like. The type of the hydrophilic group is not particularly limited, and examples thereof include a polyoxyalkylene group (for example, a polyoxyalkylene group in which a polyoxyethylene group, a polyoxypropylene group, an oxyethylene group, and an oxypropylene group are bonded to each other in blocks or in random orders), an amino group, a carboxyl group, an alkali metal salt of a carboxyl group, a hydroxy group, an alkoxy group, an amide group, a carbamoyl group, a sulfonamide group, a sulfamoyl group, a sulfonic acid group, an alkali metal salt of a sulfonic acid group, and the like. Among these, a polyoxyalkylene group is preferable as a hydrophilic group because the antibacterial layer containing this exhibits further improved antibacterial properties.

The structure of a main chain of the hydrophilic polymer is not particularly limited, and examples thereof include polyurethane, poly(meth)acrylate, polystyrene, polyester, polyamide, polyimide, polyurea, and the like.

(Monomer Having Hydrophilic Group)

As one of the preferred aspects of the hydrophilic polymer, a hydrophilic polymer obtained by polymerizing a monomer having a hydrophilic group (hereinafter, simply referred to as "hydrophilic monomer" as well) can be exemplified.

The hydrophilic monomer means a compound having the aforementioned hydrophilic group and the following polymerizable group. The definition of the hydrophilic group is as described above.

The number of hydrophilic groups in the hydrophilic monomer is not particularly limited, but is preferably equal to or greater than 2, more preferably 2 to 6, and even more preferably 2 or 3, because then it is easy to control the water contact angle of the surface of the antibacterial layer within the following range.

The type of the polymerizable group is not particularly limited, and examples thereof include a radically polymerizable group, a cationically polymerizable group, an anionically polymerizable group, and the like. Examples of the radically polymerizable group include a (meth)acryloyl group, an acrylamide group, a vinyl group, a styryl group, an allyl group, and the like. Examples of the cationically polymerizable group include a vinyl ether group, an oxiranyl group, an oxetanyl group, and the like. Among these, a (meth)acryloyl group is preferable.

The number of polymerizable groups in the hydrophilic monomer is not particularly limited, but is preferably equal to or greater than 2, more preferably 2 to 6, and even more preferably 2 or 3, because then an antibacterial layer having further improved mechanical strength is obtained.

As one of the preferred aspects of the monomer having a hydrophilic group, a compound represented by the following Formula (A) can be exemplified.

(A)

In Formula (A), $R_1$ represents a substituent (monovalent substituent). The type of the substituent is not particularly limited, and examples thereof include known substituents such as a hydrocarbon group which may have a heteroatom, the aforementioned hydrophilic group, and the like. Examples of the hydrocarbon group include an alkyl group, an aryl group, and the like.

$R_2$ represents a polymerizable group. The definition of the polymerizable group is as described above.

$L_1$ represents a single bond or a divalent linking group. The type of the divalent linking group is not particularly limited, and examples thereof include —O—, —CO—, —NH—, —CO—NH—, —COO—, —O—COO—, an alkylene group, an arylene group, a heteroaryl group, a combination of these, and the like.

$L_2$ represents a polyoxyalkylene group. The polyoxyalkylene group means a group represented by the following Formula (B).

 Formula (B)

In Formula (B), $R_3$ represents an alkylene group (for example, an ethylene group and a propylene group). m represents an integer equal to or greater than 2. m is preferably 2 to 10, and more preferably 2 to 6. * represents a binding position.

n represents an integer of 1 to 4.

For obtaining the hydrophilic polymer, the aforementioned hydrophilic monomer and another monomer (monomer that does not have a hydrophilic group) may be used in combination. That is, a hydrophilic polymer obtained by copolymerizing a hydrophilic monomer and another monomer (monomer other than the hydrophilic monomer) may also be used.

The type of another monomer is not particularly limited, and known monomers having a polymerizable group can be appropriately used. The definition of the polymerizable group is as described above.

Among these, a polyfunctional monomer having two or more polymerizable groups is preferable because this makes it possible to obtain an antibacterial layer having further improved mechanical strength. The polyfunctional monomer functions as a so-called crosslinking agent.

(Polyfunctional Monomer)

The number of polymerizable groups contained in the polyfunctional monomer is not particularly limited, but is preferably 2 to 10 and more preferably 2 to 6, because then an antibacterial layer having further improved mechanical strength is obtained, and the polyfunctional monomer has excellent handleability.

Examples of the polyfunctional monomer include trimethylolpropane triacrylate, tetramethylolmethane tetraacrylate, dipentaerythritol hexaacrylate, and pentaerythritol tetraacrylate.

A mixing ratio (mass of hydrophilic monomer/mass of another monomer) between the hydrophilic monomer and another monomer (particularly, a polyfunctional monomer) is not particularly limited, but is preferably 0.01 to 10 and more preferably 0.1 to 10, because then it is easy to control the hydrophilicity of the antibacterial layer.

The content of the hydrophilic polymer in the antibacterial layer is not particularly limited. The content of the hydrophilic polymer with respect to the total mass of the antibacterial layer is preferably equal to or greater than 50% by mass, more preferably equal to or greater than 70% by mass, and even more preferably equal to or greater than 90% by mass, because then an antibacterial layer is obtained which enables the removal of contaminants in a simple manner (having excellent removability) by washing with water and/or wiping even in a case where contaminants have adhered to the surface of the antibacterial layer. The upper limit of the content is not particularly limited, but is equal to or smaller than 95% by mass in many cases.

<Antibacterial Agent>

The antibacterial layer contains an antibacterial agent. The antibacterial agent is not particularly limited, and known organic antibacterial agents and/or inorganic antibacterial agents can be used. Among these, an antibacterial agent containing silver (hereinafter, referred to as a silver-based antibacterial agent as well) is preferable because this antibacterial agent further improves the antibacterial properties of the antibacterial layer and enables the antibacterial properties of the antibacterial layer to last for a longer period of time. Hereinafter, the silver-based antibacterial agent, an organic antibacterial agent which does not contain silver, and an inorganic antibacterial agent which does not contain silver will be specifically described. One kind of antibacterial agent may be used singly, or two or more kinds of antibacterial agents may be used in combination.

(Silver-Based Antibacterial Agent)

The type of the silver-based antibacterial agent is not particularly limited as long as it contains silver (silver atom). Examples thereof include a silver-supported carrier and silver particles. The form of silver is not particularly limited, and examples thereof include forms such as metallic silver, a silver ion, and a silver salt (including a silver complex). In the present specification, the silver complex is included in the silver salt.

Examples of the silver salt include silver acetate, silver acetylacetonate, silver azide, silver acetylide, silver arsenate, silver benzoate, silver hydrogen fluoride, silver bromate, silver bromide, silver carbonate, silver chloride, silver chlorate, silver chromate, silver citrate, silver cyanate, silver cyanide, silver (cis,cis-1,5-cyclooctadiene)-1,1,1,5,5,5-hexafluoroacetylacetonate, silver diethyldithiocarbamate, silver(I) fluoride, silver(II) fluoride, silver 7,7-dimethyl-1,1,1,2,2,3,3-heptafluoro-4,6-octanedioate, silver hexafluoroantimonate, silver hexafluoroarsenate, silver hexafluorophosphate, silver iodate, silver iodide, silver isothiocyanate, potassium silver cyanide, silver lactate, silver molybdate, silver nitrate, silver nitrite, silver(I) oxide, silver(II) oxide, silver oxalate, silver perchlorate, silver perfluorobutyrate, silver perfluoropropionate, silver permanganate, silver perrhenate, silver phosphate, silver picrate monohydrate, silver propionate, silver selenate, silver selenide, silver selenite, silver sulfadiazine, silver sulfate, silver sulfide, silver sulfite, silver telluride, silver tetrafluoroborate, silver tetraiodocuriumate, silver tetratungstate, silver thiocyanate, silver p-toluenesulfonate, silver trifluoromethanesulfonate, silver trifluoroacetate, silver vanadate, and the like.

Examples of the silver complex include a histidine-silver complex, a methionine-silver complex, a cysteine-silver complex, an aspartic acid-silver complex, a pyrrolidone carboxylic acid-silver complex, an oxotetrahydrofuran carboxylic acid-silver complex, an imidazole-silver complex, and the like.

Examples of the silver-based antibacterial agent include an organic antibacterial agent such as the aforementioned silver salt, an inorganic antibacterial agent containing the following carrier, and the like. The type of the silver-based antibacterial agent is not particularly limited.

Among these, as the silver-based antibacterial agent, a silver-supported carrier including a carrier and silver supported on the carrier is preferable, because this antibacterial agent further improves the antibacterial properties of the antibacterial layer and enables the antibacterial properties of the antibacterial layer to last for a longer period of time.

The carrier is not particularly limited, and examples thereof include calcium zinc phosphate, calcium phosphate, zirconium phosphate, aluminum phosphate, titanium phosphate, calcium silicate, activated carbon, activated alumina, silica gel, zeolite, hydroxyapatite, potassium titanate, hydrous bismuth oxide, hydrous zirconium oxide, hydrotalcite, and the like. Examples of the zeolite include natural zeolite such as chabazite, mordenite, erionite, and clinoptilolite, and synthetic zeolite such as type A zeolite, type X zeolite, and type Y zeolite.

Among these, silver particles or ceramic particles on which silver is supported (silver-supported ceramic particles, hereinafter, referred to as "silver ceramic particles" as well) are more preferable, because these carriers further improve the antibacterial properties of the antibacterial layer and enable the antibacterial properties of the antibacterial layer to last for a longer period of time. Specifically, examples thereof include silver-supported zeolite in which silver is supported on zeolite and silver-supported silica gel in which silver is supported on silica gel.

The average particle diameter of the silver-supported carrier is not particularly limited, but is preferably 0.1 to 10 μm and more preferably 0.1 to 2 μm, because then the antibacterial properties of the antibacterial layer are further improved, and the antibacterial properties of the antibacterial layer last for a longer period of time. The average particle diameter is a value determined by measuring diameters of at least ten random silver-supported carriers by using a microscope (in a case where the carrier is not spherical, the major axis thereof is measured) and calculating the arithmetic mean thereof.

The content of silver in the silver-based antibacterial agent is not particularly limited. For example, in the case of the aforementioned silver-supported carrier, the content of silver with respect to the total mass of the silver-supported carrier is preferably 0.1% to 10% by mass, and more preferably 0.3% to 5% by mass.

One kind of silver-based antibacterial agent may be used singly, or two or more kinds of silver-based antibacterial agents may be used in combination. In addition, the following organic antibacterial agent which does not contain silver and/or the following inorganic antibacterial agent which does not contain silver may be used in combination.

(Organic Antibacterial Agent)

The organic antibacterial agent which does not contain silver is not particularly limited, and examples thereof include a phenol ether derivative, an imidazole derivative, a sulfone derivative, a N-haloalkylthio compound, an anilide derivative, a pyrrole derivative, a quaternary ammonium salt, a pyridine-based compound, a triazine-based compound, a benzisothiazoline-based compound, an isothiazoline-based compound, and the like.

More specifically, examples thereof include 1,2-benzisothiazolin-3-one, N-fluorodichloromethylthio-phthalimide, 2,3,5,6-tetrachloroisophthalonitrile, N-trichloromethylthio-4-cyclohexene-1,2-dicarboximide, copper 8-quinolinate, bis(tributyltin)oxide, 2-(4-thiazolyebenzimidazole (TBZ), methyl 2-benzimidazole carbamate (BCM), 10,10'-oxybisphenoxarsine (OBPA), 2,3,5,6-tetrachloro-4-(methylsulfone)pyridine, zinc bis(2-pyridylthio-1-oxide) (ZPT), N,N-dimethyl-N'-(fluorodichloromethylthio)-N'-phenylsulfonamide (dichlofluanide), poly-(hexamethylenebiguanide)hydrochloride, dithio-2-2'-bis(benzmethylamide), 2-methyl-4,5-trimethylene-4-isothiazolin-3-one, 2-bromo-2-nitro-1,3-propanediol, hexahydro-1,3-tris-(2-hydroxyethyl)-S-triazine, p-chloro-m-xylenol, 1,2-benzisothiazolin-3-one, and the like. Among these, 2-bromo-2-nitro-1,3-propanediol, TBZ, BCM, OBPA, or ZPT is preferable, because these further improve the hydrophilicity and the antibacterial properties of the antibacterial layer.

The organic antibacterial agent also includes a natural antibacterial agent. The natural antibacterial agent includes chitosan which is basic polysaccharide obtained by hydrolyzing chitin contained in crustacean such as crab and/or shrimp.

(Inorganic Antibacterial Agent)

Examples of the inorganic antibacterial agent which does not contain silver include mercury, copper, zinc, iron, lead, bismuth, and/or an antibacterial agent containing ions of these listed in descending order of the excellence of the antibacterial properties of the antibacterial agents. Examples of the inorganic antibacterial agent also include antibacterial agents containing nickel and/or nickel ions, and those obtained by causing a metal and/or metal ions to be supported on a carrier can also be used. As the carrier, those described above can be used. Among these, copper particles slowly releasing copper ions or copper-supported ceramic particles are preferable.

(Content of Antibacterial Agent in Antibacterial Layer)

The content of the antibacterial agent in the antibacterial layer is not particularly limited. In view of the balance between the contaminant removability and the antibacterial properties, the content of the antibacterial agent with respect to the total mass of the antibacterial layer is preferably 0.001% to 20% by mass, more preferably 0.001% to 10% by mass, even more preferably 0.001% to 5% by mass, and particularly preferably 1% to 5% by mass.

In a case where an antibacterial agent which does not contain silver is used in addition to the silver-based antibacterial agent, the total content of the antibacterial agents is not limited as long as it satisfies the above range. The content of the antibacterial agent which does not contain silver with respect to the total content of the antibacterial agents is preferably equal to or smaller than 50% by mass, and more preferably equal to or smaller than 20% by mass.

In a case where silver particles used as an antibacterial agent, the content of the antibacterial agent in the antibacterial layer with respect to the total mass of the antibacterial layer is preferably 0.001% to 5% by mass, more preferably 0.001% to 2% by mass, even more preferably 0.001% to 1% by mass, and particularly preferably 0.001% to 0.1% by mass. In a case where the content of the silver particles is equal to or greater than the lower limit, an antibacterial layer having further improved antibacterial properties is easily obtained. In contrast, in a case where the content of the silver particles is equal to or smaller than the upper limit, the water contact angle of the surface of the antibacterial layer is easily reduced.

The average particle diameter of the silver particles is preferably 1 nm to 100 nm, and more preferably 1 nm to 20 nm. The smaller the particle diameter of the silver particles, the higher the ratio of surface area/volume. Accordingly, the antibacterial properties of the antibacterial layer containing silver particles having a smaller particle diameter are more easily improved.

The average particle diameter means a particle diameter at 50% in a cumulative particle size distribution measured by a laser diffraction and scattering method.

The content of the silver-based antibacterial agent in the antibacterial layer is not limited as long as it satisfies the above range. However, the content of silver with respect to the total mass of the antibacterial layer is preferably 0.001% to 20% by mass, more preferably 0.001% to 10% by mass, and even more preferably 0.001% to 5% by mass, because then the antibacterial properties of the antibacterial layer are further improved.

Furthermore, in a case where an organic silver-based antibacterial agent is used as the silver-based antibacterial agent, the content of the antibacterial agent is not limited as long as it satisfies the above range. However, the content of the antibacterial agent with respect to the total mass of the antibacterial layer is more preferably 1% to 5% by mass, because then an antibacterial layer having further improved mechanical strength is obtained.

In addition, in a case where an inorganic silver-based antibacterial agent is used as the silver-based antibacterial agent, the content of the antibacterial agent is not limited as long as it satisfies the above range. However, the content of the antibacterial agent with respect to the total mass of the antibacterial layer is preferably 0.001% to 10% by mass and more preferably 0.01% to 5% by mass, because then an antibacterial layer having further improved mechanical strength is obtained.

In a case where the silver ceramic particles are used, the content of the silver ceramic particles with respect to the total mass of the antibacterial layer is preferably 0.1% to 10% by mass. In a case where the content of the silver ceramic particles is equal to or greater than the lower limit, an antibacterial layer having further improved antibacterial properties is obtained. Furthermore, in a case where the content of the silver ceramic particles is equal to or smaller than the upper limit, an antibacterial layer having further improved hydrophilicity is obtained.

The average particle diameter of the silver ceramic particles is preferably 0.1 to 10 μm, and more preferably 0.1 to 2 μm.

In a case where the silver-based antibacterial agent and the organic antibacterial agent which does not contain silver are used in combination as an antibacterial agent, in view of the balance between the contaminant removability and the antibacterial properties, the content of the organic antibacterial agent with respect to the total mass of the antibacterial layer is preferably 0.0005% to 2.5% by mass.

<Optional Components>

The antibacterial layer may contain other components as long as it exerts the effects of the present invention. Examples of other components include a photocatalytic material containing a metal oxide. In a case where the photocatalytic material has antibacterial properties, the material may be used as an antibacterial agent.

The type of the metal oxide contained in the photocatalytic material is not particularly limited, and examples thereof include $TiO_2$, ZnO, $SrTiO_3$, CdS, GaP, InP, GaAs, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, NiO, $Cu_2O$, SiC, $MoS_2$, InPb, $RuO_2$, $CeO_2$, $Ta_3N_5$, and the like. Furthermore, the metal oxide may be a layered oxide containing at least one kind of element selected from the group consisting of Ti, Nb, Ta, and V. Particularly, the metal oxide preferably contains at least one kind of metal atom selected from the group consisting of Zn, Ti, Ni, W, Cu, Sn, Fe, Sr, and Bi, and more preferably contains Ti or W. As the metal oxide, $TiO_2$ or $WO_3$ is particularly preferable.

The average particle diameter of the photocatalytic material is not particularly limited, but is preferably 1 nm to 2 μm, more preferably 10 nm to 1.5 μm, and even more preferably 20 nm to 1 μm. The average particle diameter is a value obtained by measuring diameters of at least 10 random photocatalytic materials by using a scanning electron microscope and calculating the arithmetic mean thereof. In a case where the photocatalytic material is not spherical, a major axis thereof is taken as the diameter.

The ratio of the mass of the silver-based antibacterial agent to the mass of the photocatalytic material (mass of silver-based antibacterial agent/mass of photocatalytic material) is preferably 0.01 to 20, more preferably 0.1 to 10, and even more preferably 0.3 to 3.

<Method for Manufacturing Antibacterial Layer>

The method for manufacturing the antibacterial layer is not particularly limited, and known methods can be used. For example, it is possible to use a method of preparing a composition for forming an antibacterial layer that contains a hydrophilic polymer, an antibacterial agent, and other components (for example, a solvent) which are used if necessary and coating a support with the composition for forming an antibacterial layer so as to form an antibacterial layer, a method of bonding an antibacterial layer formed in advance to a predetermined position of a support, a method of forming a support on a composition for forming an antibacterial layer that is formed into a film in advance, and the like.

Among these, a method (coating method) is preferable in which a predetermined position on a support is coated with a composition for forming an antibacterial layer containing the hydrophilic monomer and the antibacterial agent described above so as to form a coating film, and a curing treatment is performed on the coating film so as to form an antibacterial layer, because this method makes it easier to adjust the film thickness and/or the surface roughness of the antibacterial layer.

The solid content of the composition for forming an antibacterial layer is not particularly limited, but is preferably 1% to 70% by mass and more preferably 10% to 50% by mass, because then the coating properties of the composition for forming an antibacterial layer are further improved and/or the smoothness of the obtained antibacterial film is further improved.

The composition for forming an antibacterial layer may contain a solvent. The solvent is not particularly limited, and examples thereof include water and/or an organic solvent. Particularly, it is preferable that the composition contains an organic solvent as a solvent, because then it is easy to obtain a coating film having a more uniform film thickness and/or a coating film having a smoother surface. Examples of the organic solvent include methanol, ethanol, acetone, methyl ethyl ketone, cyclohexane, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetylacetone, cyclohexanone, diacetone alcohol, ethylene glycol monomethyl ether acetate, ethylene glycol ethyl ether acetate, ethylene glycol monoisopropyl ether, ethylene glycol monobutyl ether acetate, methoxypropanol, methoxyethanol, diethylene glycol monomethyl ether, diethylene glycol monoethyl ether, diethylene glycol dimethyl ether, diethylene glycol diethyl ether, propylene glycol monomethyl ether acetate, n-propanol, isopropanol, n-butanol, 2-butanol, i-butanol, t-butanol, n-pentanol, t-amylalcohol, n-hexanol, capryl alcohol, lauryl alcohol, myristyl alcohol, phenyl ether alcohol, ethylene glycol, ethylene glycol mono-n-butyl ether, diethylene glycol mono-n-butyl ether, triethylene glycol mono-n-butyl ether, tetraethylene glycol mono-n-butyl ether, dipropylene glycol monobutyl ether, and the like. Among these, methoxypropanol is preferable. One kind of solvent may be used singly, or two or more kinds of solvents may be used in combination.

<Physical Properties of Antibacterial Layer>
(Film Thickness)

The film thickness of the antibacterial layer is not particularly limited. In view of the contaminant removability and the antibacterial properties, the film thickness of the antibacterial layer is preferably 0.5 to 20 µm, and more preferably 1 to 10 µm.

In the present specification, the film thickness of the antibacterial layer is a value obtained by the following method. First, a sample piece including the antibacterial layer is embedded in a resin, a cross section thereof is cut out using a microtome, and the cut cross section is observed with a scanning electron microscope so as to measure the film thickness of the antibacterial layer. By this method, the film thickness is repeatedly measured at 10 random points in the antibacterial layer, and the arithmetic mean of the obtained values is calculated, thereby obtaining the film thickness of the antibacterial layer.

(Water Contact Angle)

The water contact angle of the surface of the antibacterial layer is not particularly limited, but is 5° to 80° in many cases. Particularly, the water contact angle is preferably 20° to 60°, more preferably 25° to 50°, and even more preferably 25° to 40°. In a case where the water contact angle of the surface of the antibacterial layer is equal to or greater than 20°, it is more difficult for dirt such as sebum to adhere to the surface of the antibacterial layer. In a case where the water contact angle is equal to or smaller than 60°, dirt having adhered to the surface of the antibacterial layer can be more easily removed by being washed with water and the like. In the present specification, the water contact angle is a value obtained based on a sessile drop method of JIS R 3257:1999. Specifically, the water contact angle is measured using a contact angle meter LSE-ME1 (software 2win mini) manufactured by NiCK Corporation under the condition of room temperature (20° C.). More specifically, 2 µl of pure water is added dropwise to the surface of the antibacterial layer which is kept horizontal, and at a point in time when 20 seconds has elapsed from the dropwise addition, a contact angle of a droplet of the pure water on the surface of the antibacterial layer is measured by the method described above. The value obtained in this way is the water contact angle.

(Pencil Hardness)

The pencil hardness of the surface of the antibacterial layer is not particularly limited, but is equal to or higher than HB in many cases. Particularly, it is preferable that the pencil hardness is equal to or higher than 2H. The upper limit is not particularly limited, but is generally equal to or lower than 9H. In a case where the pencil hardness of the surface of the antibacterial layer is equal to or higher than 2H, an antibacterial layer is obtained which has further improved hard coat properties, particularly, further improved resistance against scratching.

In the present specification, the pencil hardness refers to a value obtained based on the pencil hardness testing method of JIS K 5600-5-4:1999.

(Vickers Hardness)

The Vickers hardness of the surface of the antibacterial layer is not particularly limited, but is equal to or higher than 1.20 in many cases. Particularly, the Vickers hardness is preferably equal to or higher than 1.33, more preferably equal to or higher than 1.35, even more preferably equal to or higher than 5, and particularly preferably equal to or higher than 10. The upper limit is not particularly limited, but is generally equal to or lower than 90. In a case where the Vickers hardness of the surface of the antibacterial layer is equal to or higher than 1.33, an antibacterial layer is obtained which has further improved hard coat properties, particularly, further improved resistance against scratch caused in a case where a sharp object is pressed thereon.

In the present specification, the Vickers hardness is a value obtained by performing a test 10 times using Vickers hardness tester (manufactured by Fischer Instruments K.K.) under the condition of a load of 20 mN/20 s and a loading time of 5 s, and calculating the arithmetic mean of the obtained values.

[Method for Manufacturing Support with Antibacterial Layer]

The method for manufacturing the support with an antibacterial layer is not particularly limited, and examples thereof include a method of forming an antibacterial layer on a support, a method of forming a support on an antibacterial layer, a method of bonding an antibacterial layer, which is formed in advance, and a support, which is formed in advance, to each other, and a method of bonding an antibacterial layer and a support to each other while forming the antibacterial layer and the support by co-extrusion and the like. Among these, a method (coating method) is preferable in which a predetermined position on a support is coated with the composition for forming an antibacterial layer so as to form a coating film, and a curing treatment is performed on the coating film so as to form an antibacterial layer.

The support with an antibacterial layer can be applied to various uses. Furthermore, the support with an antibacterial layer can be disposed on the surface of various goods. The support with an antibacterial layer exhibits excellent followability with respect to a curved surface. Therefore, the support with an antibacterial layer can be bonded to the surface of goods regardless of the surface shape of the goods. Accordingly, the support with an antibacterial layer can be used for wrapping. Furthermore, in a case where the support with an antibacterial layer is applied to a curved surface, peeling does not easily occur between the antibacterial layer and the support.

Examples of the goods to which the support with an antibacterial layer can be applied include a radiography device, a touch panel, and the like.

Figure 3:
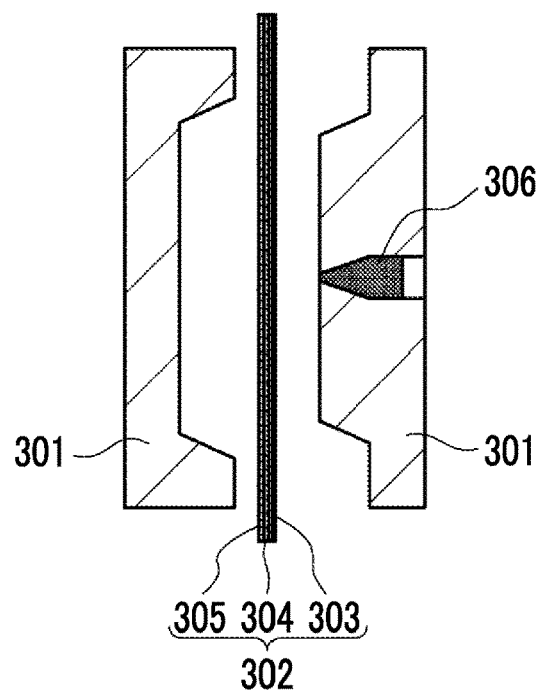
FIG. 3 is a schematic view showing a process of manufacturing a resin molded material by an in-mold forming method.
Figure 4:
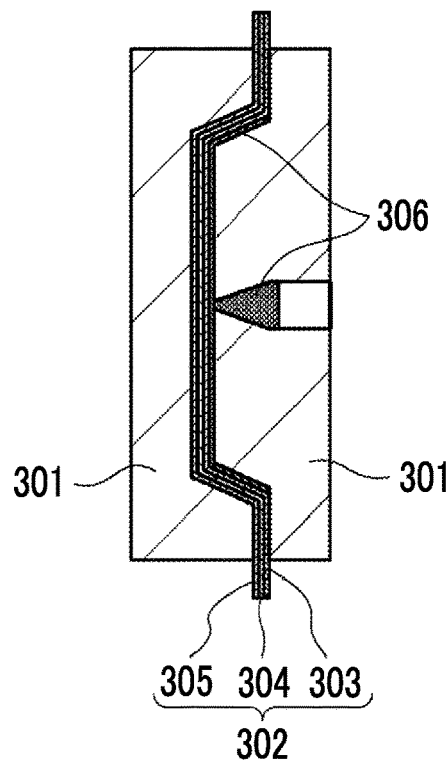
FIG. 4 is a schematic view showing the process of manufacturing a resin molded material by an in-mold forming method.
Figure 5:
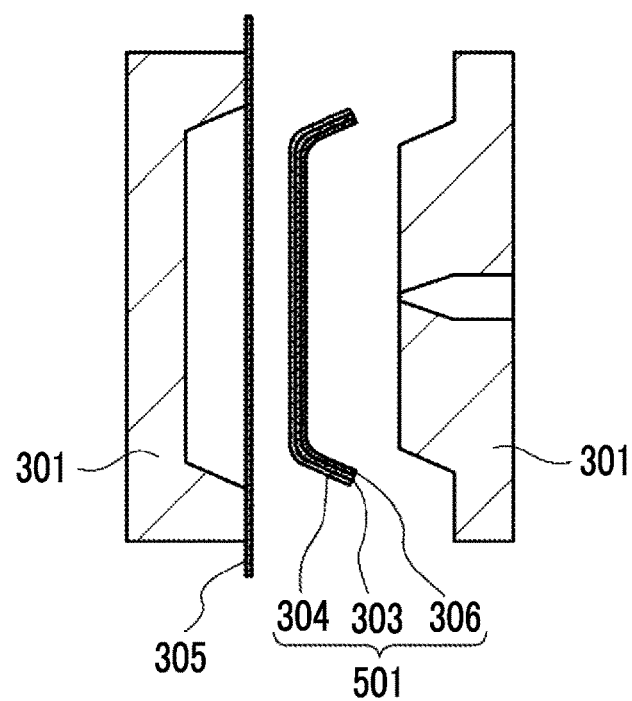
FIG. 5 is a schematic view showing the process of manufacturing a resin molded material by an in-mold forming method.

For manufacturing a resin molded material including the support with an antibacterial layer disposed on the surface thereof (hereinafter, simply referred to as "resin molded material"), an in-mold forming method can be used. FIGS. 3 to 5 are schematic views showing a process for manufacturing the resin molded material by using the in-mold forming method in the time series. Hereinafter, the process for manufacturing the resin molded material by the in-mold forming method will be specifically described using the drawings.

The manufacturing process by the in-mold forming method includes the following steps (a) to (d).

(a) Step of inserting a support with an antibacterial layer 302 into a mold for in-mold forming 301 such that a side 303 of the support faces the inside of the mold (FIG. 3).

(b) Step of injecting a molten resin 306 into the mold for in-mold forming 301 (FIG. 4).

(c) Step of integrating the support with an antibacterial layer 302 with the resin 306 such that the support with an antibacterial layer 302 is disposed on a surface of the resin 306 (FIG. 4).

(d) Step of performing cooling (cooling may be performed if necessary), taking a resin molded material 501 out of the mold, and then peeling a protective sheet 305 of the support with an antibacterial layer (FIG. 5).

By manufacturing the resin molded material 501 by the manufacturing process described above, the resin molded material 501 including an antibacterial layer 304 on a surface thereof can be obtained.

The film thickness of the support with an antibacterial layer is not particularly limited, but is 10.5 to 3,000 µm in many cases. The film thickness is preferably equal to or greater than 30 µm, because then the peeling between the support and the antibacterial layer is further inhibited. In addition, the film thickness is preferably equal to or smaller than 350 µm, because then the support with an antibacterial layer exhibits excellent followability with respect to a curved surface. The film thickness of the support with an antibacterial layer can be measured by the same method as the method for measuring the film thickness of the support.

[Laminate]

A laminate according to a second embodiment of the present invention includes the aforementioned support with an antibacterial layer and a pressure sensitive adhesive layer, in which the antibacterial layer, the support, and the pressure sensitive adhesive layer are laminated in this order.

Hereinafter, the laminate will be specifically described with reference to a drawing.

Figure 6:
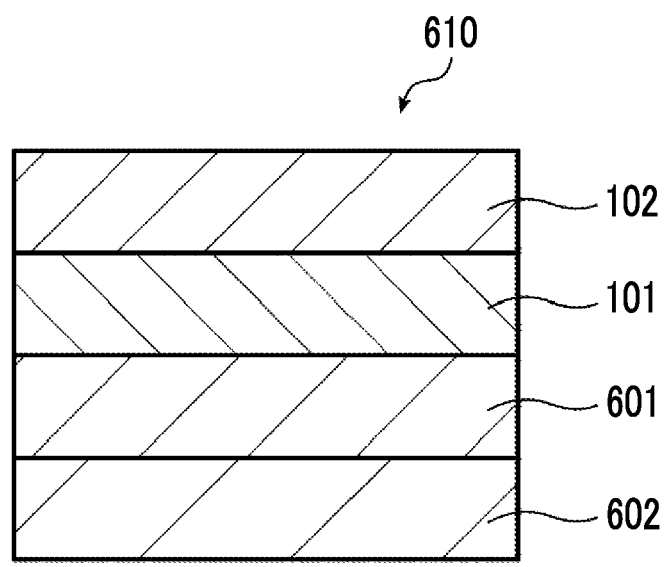
FIG. 6 is a cross-sectional view of a laminate according to a second embodiment of the present invention.

FIG. 6 is a cross-sectional view of the laminate according to the second embodiment of the present invention. A laminate having 610 includes the support 101, the antibacterial layer 102, and a pressure sensitive adhesive layer 601. The pressure sensitive adhesive layer 601 is disposed on a surface (rear surface) of the support 101 that is opposite to a surface of the support 101 on which the antibacterial layer 102 is disposed. In the laminate 610, between the surfaces of the pressure sensitive adhesive layer 601, the surface opposite to the surface of the support 101 side may be further provided with a separator 602. By peeling the separator at the time of use and then bonding the laminate 610 to an adherend not shown in the drawing, the laminate 610 including the separator 602 can be used. Furthermore, the laminate may further include a primer layer between the antibacterial layer 102 and the support 101 and/or between the support 101 and the pressure sensitive adhesive layer 601.

[Support with Antibacterial Layer]

The support with an antibacterial layer included in the laminate is as described above, and preferred aspects thereof are also as described above.

[Pressure Sensitive Adhesive Layer]

The pressure sensitive adhesive layer is not particularly limited as long as it enables the laminate and an adherend to be bonded to each other. The pressure sensitive adhesive layer may be formed using a known pressure sensitive adhesive. The pressure sensitive adhesive is not particularly limited, and examples thereof include a (meth)acryl-based pressure sensitive adhesive, a rubber-based pressure sensitive adhesive, a silicone-based pressure sensitive adhesive, a urethane-based pressure sensitive adhesive, a polyester-based pressure sensitive adhesive, and the like. Considering the fact that either or both of bonding and peeling are repeated, and bonding needs to be performed while preventing the inflow of air bubbles, a self-adhesive pressure sensitive adhesive can also be preferably used.

The method for forming the pressure sensitive adhesive layer is not particularly limited, and examples thereof include a coating method, a printing method, a bonding method, and the like. Among these, a method of forming the pressure sensitive adhesive layer by coating or a method of forming the pressure sensitive adhesive layer by bonding a pressure sensitive adhesive sheet can be preferably used, and the method for forming the pressure sensitive adhesive layer by bonding a pressure sensitive adhesive sheet is more preferable.

The film thickness of the pressure sensitive adhesive layer is not particularly limited, and can be appropriately selected according to the desired bonding force and the like. Particularly, the film thickness is preferably 1 µm to 100 µm. In a case where the film thickness of the pressure sensitive adhesive layer is equal to or greater than the lower limit, the pressure sensitive adhesive layer can be stably produced. In a case where the film thickness of the pressure sensitive adhesive layer is equal to or smaller than the upper limit, the cost of the material is reduced.

EXAMPLES

Hereinafter, the present invention will be more specifically described based on examples. The materials, the amount and proportion of the materials used, the content of a treatment, the procedure of a treatment, and the like shown in the following examples can be appropriately modified as long as the gist of the present invention is maintained. Accordingly, the scope of the present invention should not be limitedly interpreted by the following examples.

[Preparation of Composition for Forming Antibacterial Layer]

The following materials were mixed together according to the makeup shown in Table 1, thereby obtaining compositions for forming an antibacterial layer C-1 to C-9. By using a solvent, the solid content of each of the compositions for forming an antibacterial layer was adjusted such that it became 40% by mass.

Monomer A: Miramer M4004 (manufactured by Toyo Chemicals Co., Ltd.), ethoxylated pentaerythritol tetraacrylate, corresponding to hydrophilic monomer.

Monomer B: Miramer M3150 (manufactured by Toyo Chemicals Co., Ltd.), ethoxylated pentaerythritol triacrylate, corresponding to hydrophilic monomer.

Monomer C: Miramer M420 (manufactured by Toyo Chemicals Co., Ltd.), pentaerythritol tetraacrylate, not containing hydrophilic group, corresponding to polyfunctional monomer.

Polymer: PEG 200 (manufactured by KANTO KAGAKU), polyethylene glycol, corresponding to hydrophilic polymer.

Crosslinking agent: A-DPH (manufactured by SHIN-NAKAMURA CHEMICAL CO., LTD.), dipentaerythritol hexaacrylate.

Polymerization initiator: IRGACURE 184 (manufactured by BASF SE), 1-hydroxy-cyclohexyl-phenyl-ketone Antibacterial agent X-1: silver ceramic particle dispersion (manufactured by Fuji Chemical Industries, Ltd., average particle diameter: 0.8 µm, antibacterial agent concentration: 50 wt %), corresponding to silver-based antibacterial agent.

Antibacterial agent X-2: silver particle dispersion (manufactured by Japan Ion Co., average particle diameter: 7 to 10 nm, silver particle concentration: 1 wt %), corresponding to silver-based antibacterial agent.

Antibacterial agent X-3: titanium oxide particles (manufactured by NIPPON AEROSIL CO., LTD, average particle diameter: 20 nm), corresponding to inorganic antibacterial agent not containing silver Solvent: methoxypropanol

TABLE 1

| Composition for forming antibacterial layer | Monomer A (part by mass) | Monomer B (part by mass) | Monomer C (part by mass) | Polymer (part by mass) | Crosslinking agent (part by mass) | Polymerization initiator (part by mass) | Antibacterial agent Type | Antibacterial agent Content (part by mass) |
|---|---|---|---|---|---|---|---|---|
| C-1 | 30 | 30 | 13 | — | 22 | 3 | X-1 | 2 |
| C-2 | 37 | 37 | — | — | 21 | 3 | X-1 | 2 |
| C-3 | 10 | 10 | 54 | — | 21 | 3 | X-1 | 2 |
| C-4 | 30 | 30 | 13 | — | 22 | 3 | X-3 | 2 |
| C-5 | 30 | 30 | 14.5 | — | 22 | 3 | X-1 | 0.5 |
| C-6 | 26 | 26 | 13 | 8 | 22 | 3 | X-1 | 2 |
| C-7 | 23 | 23 | 13 | 14 | 22 | 3 | X-1 | 2 |
| C-8 | 30 | 30 | 13 | — | 22 | 3 | X-2 | 2 |
| C-9 | 30 | 30 | 13 | — | 21 | 3 | X-1 | 3 |

[Preparation of Support with Antibacterial Layer]

Example 1

One surface of a support (trade name: "DUS605-CER", manufactured by Sheedom Co., Ltd., film thickness: 200 μm) containing a urethane resin was coated with the composition for forming an antibacterial layer C-1 by using a bar coater, thereby obtaining a support with a coating film. Then, the support with a coating film was put into an oven at 120° C. and dried for 2 minutes. The support with a coating film was then taken out of the oven, and the coating film was irradiated with ultraviolet rays under the condition of 400 mW/cm$^2$ and 300 mJ/cm$^2$ such that the coating film was cured, thereby preparing a support with an antibacterial layer. For the irradiation of ultraviolet rays, an ultraviolet irradiation device EYE CURE LIGHT manufactured by EYE GRAPHICS Co., Ltd was used.

Thereafter, the average film thickness of the antibacterial layer was measured. First, a cross section of the support with an antibacterial layer was cut out by using a microtome. The cut cross section of the support with an antibacterial layer was observed using a scanning electron microscope so as to measure the film thickness. At 10 random positions in the support with an antibacterial layer, a series of steps from the cutting out to the measurement of the film thickness was performed, and the arithmetic mean of the film thicknesses at each point was calculated, thereby measuring the average film thickness of the antibacterial layer. As a result, the average film thickness was 8 μm.

Examples 2 to 13 and Comparative Examples 1 and 2

Supports with an antibacterial layer of Examples 2 to 13 and Comparative Examples 1 and 2 were prepared in the same manner as that described above. The support and the composition for forming an antibacterial layer used and the film thickness of the antibacterial layer are shown in Table 2.

TABLE 2

| | Composition for forming antibacterial layer | Film thickness of antibacterial layer (μm) | Support Resin | Support Film thickness (μm) |
|---|---|---|---|---|
| Example 1 | C-1 | 8 | Y-1 | 200 |
| Example 2 | C-2 | 8 | Y-1 | 200 |
| Example 3 | C-3 | 8 | Y-1 | 200 |
| Example 4 | C-4 | 8 | Y-1 | 200 |
| Example 5 | C-5 | 8 | Y-1 | 200 |
| Example 6 | C-6 | 8 | Y-1 | 200 |
| Example 7 | C-7 | 8 | Y-1 | 200 |
| Example 8 | C-1 | 8 | Y-1 | 20 |
| Example 9 | C-1 | 8 | Y-1 | 500 |
| Example 10 | C-1 | 8 | Y-2 | 200 |
| Example 11 | C-8 | 8 | Y-1 | 200 |
| Example 12 | C-9 | 8 | Y-1 | 200 |
| Example 13 | C-1 | 8 | Y-1 | 75 |
| Comparative Example 1 | C-1 | 8 | Y-3 | 200 |
| Comparative Example 2 | C-1 | 8 | Y-4 | 200 |

Y-1 to Y-4 in the above table correspond to the following resins.
Y-1: "DUS605-CER", manufactured by Sheedom Co., Ltd., urethane resin.
Y-2: "SDS96", manufactured by Okura Industrial Co., Ltd., urethane resin.
Y-3: "A4300", manufactured by Toyobo Co., Ltd, polyethylene terephthalate, not containing urethane resin.
Y-4: "ARTRON", manufactured by Mitsubishi Plastics, Inc., polyvinyl chloride, not containing urethane resin.

[Evaluation]

The supports with an antibacterial layer of examples and comparative examples obtained as above were evaluated in terms of the following items. The results are summarized in Table 3.

[Followability with Respect to Curved Surface]

A surface (rear surface), which was opposite to a surface provided with the antibacterial layer, of the support with an antibacterial layer was coated with a silicone-based pressure sensitive adhesive KR-3704 manufactured by Shin-Etsu Chemical Co., Ltd by using a bar coater such that the film thickness thereof became 50 μm after drying, thereby forming a coating film. Then, the support with an antibacterial layer was put into an oven at 120° C., and the coating film was dried and subjected to additional reactions for 2 minutes such that the antibacterial layer, the support, and the pressure sensitive adhesive layer were laminated in this order. In this way, a laminate was obtained.

The pressure sensitive adhesive layer of the laminate was bonded to a ϕ 30 mm circular iron pipe and kept as it was for 10 minutes under the condition of 25° C. and humidity of 60%, and the peeling of the laminate from the circular iron pipe was evaluated. According to the state of peeling of the laminate from the circular iron pipe, the laminate was evaluated as A "the laminate substantially was not peeled", B "the laminate was slightly peeled", or C "the laminate was seriously peeled". The laminates that attained "B" or a higher grade by the evaluation are in a range of practical use.

[Peeling Between Support and Antibacterial Layer]

The pressure sensitive adhesive layer of each of laminates, which were prepared by the same method as that used for preparing the laminates used in the evaluation of [Followability with respect to curved surface] described above, was bonded to a φ 30 mm circular iron pipe and kept as it was for 10 minutes under the condition of 25° C. and humidity of 60%, peeling between the support and the antibacterial layer in the laminate was evaluated. According to the state of peeling between the support and the antibacterial layer, the laminate was evaluated as A "the laminate substantially was not peeled", B "the laminate was slightly peeled", or C "the laminate was seriously peeled". The laminates that attained grade "B" or a higher grade by the evaluation are in a range of practical use.

[Fingerprint Proofness]

The fingerprint proofness of the antibacterial layer was evaluated by the following method. An index finger was pressed on the surface of the antibacterial layer of the support with an antibacterial layer, and the state where the fingerprint left on the surface of the antibacterial layer was visually evaluated. According to the ease of noticing the shape of the fingerprint, the antibacterial layer was evaluated as A "the fingerprint was faint and was not easily noticed", B "the fingerprint was slightly noticeable", or C "the fingerprint was clearly seen". The antibacterial layers that attained grade "B" or a higher grade by the evaluation are in a range of practical use.

[Dirt Wiping Properties]

The dirt wiping properties of the antibacterial layer were evaluated by the following method. An index finger was pressed on the surface of the antibacterial layer of the support with an antibacterial layer such that the fingerprint left. Then, the surface of the antibacterial layer was wiped with waste cloth wet with water, and the state where the fingerprint left was visually evaluated. According to the ease of noticing the shape of the fingerprint, the antibacterial layer was evaluated as A "the fingerprint was faint and was not easily noticed", B "the fingerprint was slightly noticeable", or C "the fingerprint was clearly seen". The antibacterial layers that attained grade "B" or a higher grade by the evaluation are in a range of practical use.

[Antibacterial Properties]

The antibacterial properties of the antibacterial layer were evaluated by the following method. The antibacterial layer was tested based on JIS Z 2801:2010. First, the support with an antibacterial layer was cut in a predetermined size, and by using the cut support with an antibacterial layer, a sample was prepared. The surface of the antibacterial layer of the prepared sample was inoculated with *Escherichia coli* broth prepared at a predetermined bacterial count, and the sample was cultured (temperature: 35° C., relative humidity: 90%). Then, after the culture ended, the bacteria were extracted from the sample, and the viable bacterial count in the extract was measured. The culture time was set to be 0 to 24 hours. The antibacterial properties were evaluated based on the culture time taken until the viable bacterial count became equal to or smaller than a detection limit. That is, in a case where the culture time taken until the viable bacterial count became equal to or smaller than a detection limit was equal to or shorter than 30 minutes, the antibacterial layer was evaluated as A "the antibacterial properties are very excellent"; in a case where the culture time was longer than 30 minutes and equal to or shorter than 60 minutes, the antibacterial layer was evaluated as B "the antibacterial properties are excellent"; in a case where the culture time was longer than 60 minutes and equal to or shorter than 2 hours, the antibacterial layer was evaluated as C "the antibacterial properties are fair"; in a case where the culture time was longer than 2 hours and equal to or shorter than 3 hours, the antibacterial layer was evaluated as D "the antibacterial properties are poor"; and in a case where the culture time was longer than 3 hours, the antibacterial layer was evaluated as E "the antibacterial properties are very poor".

[Water Contact Angle]

The water contact angle of the surface of the antibacterial layer was measured by the following method. The water contact angle was measured based on a sessile drop method of JIS R 3257:1999 under the condition of room temperature (20° C.) by using a contact angle meter LSE-ME1 (software 2win mini) (manufactured by NiCK Corporation). First, 2 µl of pure water was added dropwise to the surface of the antibacterial layer which was kept horizontal. At a point in time when 20 seconds had elapsed from the dropwise addition of the pure water, a contact angle of a droplet of the pure water on the surface of the antibacterial layer was measured.

[Pencil Hardness]

The pencil hardness of the antibacterial layer was evaluated by the following method. By a test method based on the pencil hardness testing method of JIS K 5600-5-4:1999, the scratch hardness of the surface of the antibacterial layer was measured.

[Vickers Hardness]

The Vickers hardness of the antibacterial layer was evaluated by the following method. By using a Vickers hardness tester (manufactured by Fischer Instruments K.K.), a test was performed 10 times under the condition of a load of 20 mN/20 s and a loading time of 5 s, and the arithmetic mean of the obtained values was calculated.

TABLE 3

| | Evaluation | | | | | | | | |
|---|---|---|---|---|---|---|---|---|---|
| | Followability with respect to curved surface | Peeling between support and antibacterial layer | Fingerprint proofness | Dirt wiping properties | Antibacterial properties | Film thickness of support with an antibacterial layer (µm) | Water contact angle (°) | Pencil hardness | Vickers hardness |
| Example 1 | A | A | A | A | A | 208 | 27 | 3H | 20 |
| Example 2 | A | A | B | A | A | 208 | 8 | 2H | 10 |
| Example 3 | A | A | A | B | A | 208 | 80 | 2H | 8 |
| Example 4 | A | A | A | A | B | 208 | 30 | 2H | 20 |
| Example 5 | A | A | A | A | B | 208 | 31 | 2H | 21 |
| Example 6 | A | A | A | A | A | 208 | 26 | F | 1.35 |

TABLE 3-continued

| | Followability with respect to curved surface | Peeling between support and antibacterial layer | Fingerprint proofness | Dirt wiping properties | Antibacterial properties | Film thickness of support with an antibacterial layer (μm) | Water contact angle (°) | Pencil hardness | Vickers hardness |
|---|---|---|---|---|---|---|---|---|---|
| Example 7 | A | A | A | A | A | 208 | 23 | HB | 1.3 |
| Example 8 | A | B | A | A | A | 28 | 27 | 3H | 20 |
| Example 9 | B | A | A | A | A | 508 | 27 | 3H | 20 |
| Example 10 | A | A | A | A | A | 208 | 27 | 3H | 20 |
| Example 11 | A | A | A | A | A | 208 | 26 | 3H | 20 |
| Example 12 | A | A | A | A | A | 208 | 25 | 3H | 20 |
| Example 13 | A | A | A | A | A | 83 | 27 | 3H | 20 |
| Comparative Example 1 | C | A | A | A | A | 208 | 27 | 3H | 20 |
| Comparative Example 2 | B | C | A | A | A | 208 | 27 | 3H | 20 |

From the results shown in Table 3, it was understood that in the supports with an antibacterial layer of Examples 1 to 13, the followability with respect to a curved surface is excellent, and peeling between the support and the antibacterial layer does not easily occur. In contrast, it was understood that in the support with an antibacterial layer of Comparative Example 1 including a support formed of polyethylene terephthalate and the support with an antibacterial layer of Comparative Example 2 including a support formed of PVC, the followability with respect to a curved surface is poor, or peeling between the support and the antibacterial layer easily occurs.

It was understood that the support with an antibacterial layer of Example 1, in which the water contact angle of the surface of the antibacterial layer is within a range of 20° to 60°, has fingerprint proofness better than that of the support with an antibacterial layer of Example 2 in which the water contact angle is less than 20°. Furthermore, it was understood that the support with an antibacterial layer of Example 1 has dirt wiping properties better than those of the support with an antibacterial layer of Example 3 in which the water contact angle is larger than 60°.

It was understood that the support with an antibacterial layer of Example 1 including an antibacterial layer containing a silver-based antibacterial agent has antibacterial properties better than those of the support with an antibacterial layer of Example 4 including an antibacterial layer containing an inorganic antibacterial agent which does not contain silver.

It was understood that the support with an antibacterial layer of Example 1 including an antibacterial layer, in which the content of the antibacterial agent with respect to the total mass of the antibacterial layer is 2 parts by mass, has antibacterial properties better than those of the support with an antibacterial layer of Example 5 including an antibacterial layer in which the content of the antibacterial agent with respect to the total mass of the antibacterial layer is 0.5 parts by mass.

It was understood that the peeling between the support and the antibacterial layer is further inhibited in the support with an antibacterial layer of Example 1, in which the film thickness of the support with an antibacterial layer is within a range of 30 to 350 μm, than in the support with an antibacterial layer of Example 8 in which the film thickness of the support with an antibacterial layer is less than 30 μm.

Furthermore, it was understood that the support with an antibacterial layer of Example 1 exhibits followability with respect to a curved surface that is better than that of the support with an antibacterial layer of Example 9 in which the film thickness of the support with an antibacterial layer is larger than 350 μm.

EXPLANATION OF REFERENCES

101: support
102: antibacterial layer
110: support with antibacterial layer according to first embodiment
201: primer layer
210: support with antibacterial layer as modification example of first embodiment
301: mold for in-mold forming
302: support with antibacterial layer
303: support
304: antibacterial layer
305: protective sheet
306: resin
501: resin molded material
601: pressure sensitive adhesive layer
602: separator
610: laminate according to second embodiment

What is claimed is:

1. A support with an antibacterial layer, comprising:
a support; and
an antibacterial layer disposed in at least a portion on the support,
wherein the support contains a urethane resin,
the antibacterial layer contains a hydrophilic polymer and an antibacterial agent,
the support with the antibacterial layer has a film thickness of 83 to 350 μm,
the film thickness of the support is equal to or greater than 75 μm,
the hydrophilic polymer is obtained by polymerizing a compound represented by the following Formula (A):

$$(R_1)_{4-n}C(-L_1-L_2-R_2)_n \quad (A)$$

wherein $R_1$ represents a hydrocarbon group optionally including a heteroatom, $R_2$ represents a radically polymerizable group, $L_1$ represents a single bond or a divalent linking group, $L_2$ represents a polyoxyalkylene group, and n represents an integer of 1 to 4.

2. The support with the antibacterial layer according to claim 1, wherein the water contact angle of a surface of the antibacterial layer is 20° to 60°.

3. The support with the antibacterial layer according to claim 2,
wherein the antibacterial agent contains silver.

4. The support with the antibacterial layer according to claim 2,
wherein a surface of the support and the antibacterial layer are in direct contact with each other.

5. The support with the antibacterial layer according to claim 2,
wherein the pencil hardness of the antibacterial layer is equal to or higher than 2H.

6. The support with the antibacterial layer according to claim 2,
wherein the Vickers hardness of the antibacterial layer is equal to or higher than 1.33.

7. The support with the antibacterial layer according to claim 1,
wherein the antibacterial agent contains silver.

8. The support with the antibacterial layer according to claim 7,
wherein a surface of the support and the antibacterial layer are in direct contact with each other.

9. The support with the antibacterial layer according to claim 7,
wherein the pencil hardness of the antibacterial layer is equal to or higher than 2H.

10. The support with the antibacterial layer according to claim 7,
wherein the Vickers hardness of the antibacterial layer is equal to or higher than 1.33.

11. The support with the antibacterial layer according to claim 1,
wherein a surface of the support and the antibacterial layer are in direct contact with each other.

12. The support with the antibacterial layer according to claim 11,
wherein the pencil hardness of the antibacterial layer is equal to or higher than 2H.

13. The support with the antibacterial layer according to claim 11,
wherein the Vickers hardness of the antibacterial layer is equal to or higher than 1.33.

14. The support with the antibacterial layer according to claim 1,
wherein the pencil hardness of the antibacterial layer is equal to or higher than 2H.

15. The support with the antibacterial layer according to claim 14,
wherein the Vickers hardness of the antibacterial layer is equal to or higher than 1.33.

16. The support with the antibacterial layer according to claim 1,
wherein the Vickers hardness of the antibacterial layer is equal to or higher than 1.33.

17. A laminate comprising:
the support with the antibacterial layer according to claim 1; and
a pressure sensitive adhesive layer,
wherein the antibacterial layer, the support, and the pressure sensitive adhesive layer are laminated in this order.

18. The support with the antibacterial layer according to claim 1,
wherein the film thickness of the antibacterial layer is 0.5 to 20 μm.

19. The support with the antibacterial layer according to claim 1,
wherein the antibacterial agent is a silver-supported carrier including a carrier and silver supported on the carrier.

20. The support with the antibacterial layer according to claim 1,
wherein the content of the antibacterial agent with respect to the total mass of the antibacterial layer is 1% to 20%.

21. The support with the antibacterial layer according to claim 1,
wherein n represents an integer of 2 or 3.

22. The support with the antibacterial layer according to claim 1,
wherein the hydrophilic polymer is formed by polymerizing the compound represented by Formula (A) and another monomer.

23. The support with the antibacterial layer according to claim 22,
wherein the another monomer is a polyfunctional monomer having two or more polymerizable groups.

24. The support with the antibacterial layer according to claim 1,
wherein the tensile elastic modulus of the support is 5 to 150 MPa.

* * * * *